(12) United States Patent
Sprague et al.

(10) Patent No.: US 7,752,048 B2
(45) Date of Patent: Jul. 6, 2010

(54) METHOD AND APPARATUS FOR PROVIDING SPEECH RECOGNITION RESOLUTION ON A DATABASE

(75) Inventors: Karen Lynn Sprague, San Francisco, CA (US); Ashish Vora, Naperville, IL (US)

(73) Assignee: Oracle International Corporation, Redwood Shores, CA (US)

( * ) Notice: Subject to any disclaimer, the term of this patent is extended or adjusted under 35 U.S.C. 154(b) by 1168 days.

(21) Appl. No.: 11/140,647

(22) Filed: May 27, 2005

(65) Prior Publication Data

US 2006/0271361 A1 Nov. 30, 2006

(51) Int. Cl.
G10L 15/28 (2006.01)
(52) U.S. Cl. ............... 704/255; 704/251; 704/240; 704/201; 709/218; 705/7; 705/35
(58) Field of Classification Search ......... 704/207, 704/255, 256, 247, 9, 251, 236, 239, 240, 704/201; 379/88.04, 88.02; 709/218; 705/7, 705/35
See application file for complete search history.

(56) References Cited

U.S. PATENT DOCUMENTS

| | | | |
|---|---|---|---|
| 5,915,001 A | 6/1999 | Uppalura | |
| 5,999,525 A | 12/1999 | Krishnaswamy et al. | |
| 6,167,395 A * | 12/2000 | Beck et al. ................. | 707/3 |
| 6,192,340 B1 * | 2/2001 | Abecassis ................. | 704/270 |
| 6,400,806 B1 | 6/2002 | Uppalura | |
| 6,456,972 B1 | 9/2002 | Gladstein et al. | |
| 6,560,590 B1 * | 5/2003 | Shwe et al. ................. | 706/55 |
| 6,615,172 B1 | 9/2003 | Bennett et al. | |
| 6,633,846 B1 | 10/2003 | Bennett et al. | |
| 6,665,640 B1 | 12/2003 | Bennett et al. | |
| 6,801,604 B2 | 10/2004 | Maes et al. | |
| 6,801,892 B2 | 10/2004 | Yamamoto | |
| 6,807,529 B2 | 10/2004 | Johnson et al. | |
| 6,832,196 B2 * | 12/2004 | Reich ................. | 704/270.1 |
| 6,891,932 B2 * | 5/2005 | Bhargava et al. ......... | 379/88.02 |
| 7,016,845 B2 * | 3/2006 | Vora et al. ................. | 704/270.1 |
| 7,032,115 B2 * | 4/2006 | Kashani ................. | 713/300 |
| 7,124,101 B1 * | 10/2006 | Mikurak ................. | 705/35 |
| 7,130,807 B1 * | 10/2006 | Mikurak ................. | 705/7 |
| 7,243,069 B2 * | 7/2007 | Jaepel et al. ............... | 704/235 |

OTHER PUBLICATIONS

U.S. Appl. No. 60/425,178, Vora, et al.

* cited by examiner

Primary Examiner—Vijay B Chawan

(57) ABSTRACT

A method of providing speech recognition resolution in a database includes receiving an utterance from an end-user or application, and dispatching it to the database which is coupled to or has access to a speech recognition technology. The method further includes converting the utterance to an intermediate form suitable for searching, and transmitting the intermediate form from the database to the speech recognition technology. An item-matching is then performed via the speech recognition technology which returns items matching the utterance to the database along with a confidence metric, and the utterance matches are then provided from the database in the form of an ordered result set.

20 Claims, 5 Drawing Sheets

500

| Confidence | Column 1 | Column 2 | Column 3... |
|---|---|---|---|
| .593 | Data[1,1] | Data[1,2] | Data[1,3] |
| .347 | Data[2,1] | Data[2,2] | Data[2,3] |
| .298 | Data[3,1] | Data[3,2] | |

Row 1, Row 2, Row 3

502

Result Set

FIG. 5

METHOD AND APPARATUS FOR PROVIDING SPEECH RECOGNITION RESOLUTION ON A DATABASE

BACKGROUND

The field of the invention relates, in general, to speech recognition, and more particularly to a method and apparatus for providing speech recognition resolution in the database layer.

A Voice application written for example in VoiceXML (a derivative of the Extensible Markup Language (XML)) processes spoken input from a user through the use of grammars, which define what utterances the application can resolve. VoiceXML (VXML) allows a programmer to define a "graph" that steps a user through a selection process—known as voice dialogs. The user interacts with these voice dialogs through the oldest interface known to mankind: the voice. Hence, VoiceXML is a markup language for building interactive voice applications which, for example, function to provide recognition of audio inputs such as speech and touch-tone Dual Tone Multi-Frequency (DTMF) input, play audio, control a call flow, etc.

A VoiceXML application comprises a set of VoiceXML files. Each VoiceXML file may involve one or more dialogs describing a specific interaction with the user. These dialogs may present the user with information and/or prompt the user to provide information. A VoiceXML application functions similar to an Internet-based application accessed through a web browser, in that it typically does not access the data at a dial-in site but often connects to a server that gathers the data and presents it. The process is akin to selecting a hyperlink on a traditional Web page. Dialog selections may result in the playback of audio response files (either prerecorded or dynamically generated via a server-side text-to-speech conversion).

Grammars can be used to define the words and sentences (or touch-tone DTMF input) that can be recognized by a VoiceXML application. These grammars can, for example, be included inline in the application or as files, which are treated as external resources. Instead of a web browser, VoiceXML pages may be rendered through Voice Gateways, which may receive VoiceXML files served up by a web or application server as users call in to the gateway.

Voice Gateways typically comprise seven major components, as follows: a Telephony Platform that can support voice communications as well as digital and analog interfacing, an Automated Speech Recognition (ASR) Engine, a Text To Speech synthesis (TTS) engine, a Media Playback engine to play audio files, a Media Recording engine to record audio input, a Dual Tone Multi-Frequency (DTMF) Engine for touchtone input, and a Voice Browser (also known as a VoiceXML Interpreter). When a VoiceXML file is rendered by a Voice Gateway, the grammars may be compiled by the ASR engine on the Voice Gateway.

The resolution capabilities of standard ASR engines are often fairly limited because performance in resolving utterances declines quickly with size, typically limiting grammar sizes to the order of a few thousand possible utterances. In the past, this problem with using large grammars for applications such as directory automation services was sometimes addressed through the use of specialized large scale speech recognition technology capable of efficiently resolving greater than a few thousand utterances. This technology often involves hardware and software solutions, which included a telephony interface, resource manager, specialized ASR and TTS engine, customized backend data connectivity, and proprietary dialog creation environments integrated together in one package. The specialized ASR in these packages is sometimes capable of resolving grammars with millions of allowable utterances. However, this specialized hardware and software solution has many drawbacks, for example it does not take advantage of the centralization of data and standardization of data access protocols. For example, a data synchronization problem can arise when a set of data (such as a corporate directory) is stored in one location by a enterprise and is replicated by the specialized solution. This problem can occur because any time the underlying data set changes (e.g. due to a hiring, firing, etc.), the replicated data state also needs to be refreshed. Furthermore, these specialized systems often create a requirement that the call flow elements of a large-scale speech recognition application must be designed as part of the proprietary dialog creation environment, which effectively makes these applications non-portable. Furthermore, utilization of these specialized systems often locks users into the particular TTS engines and telephony interfaces provided as part of the specialized system, further reducing the ability to switch implementations of the underlying large-scale speech recognition technology.

Enabling large-scale grammar resolution through an application server has been proposed to resolve some of these drawbacks. Specifically, enabling large-scale grammar resolution in the application server can allow the information and data resources that will make up the large scale grammar to remain in a centralized location. Application servers make use of a variety of industry standard data connectivity methods and protocols. Taking advantage of this data centralization allows for reduced (though not eliminated) duplication of data and memory state. Additionally, by consolidating large-scale grammar resolution through an application server, administration of the large-scale search technology can be simplified. Large-scale grammar resolution through an application server can also allow application developers to write their applications in any language supported by the application server, rather than in the proprietary format of third-party Dialog Creation Environments. Application developers can therefore make use of standard programming conventions, execution models, and APIs (Application Programming Interfaces) when writing their applications. Problems remain with the application server approach, however, including data state replication, data synchronization and recognition result return problems.

Although large-scale speech recognition through the application server solves some problems, further advantages can be gained by providing the large scale speech recognition in the database layer. In one such approach, for example, each database row can have an additional key that can be used to access it when the key corresponds to a sound or utterance. Thus, the large scale grammar resolution engine can be integrated with the data structures used to store data in the database. As a result, data from a table in the database can be selected by voice by performing automatic speech recognition of an utterance from the user against any set of data within the database. This approach can also permit the dataset to be synchronized with the grammar to be resolved and could enable users to search any table via voice without the overhead of initializing or priming a dataset within a specialized automatic voice recognition engine. One implementation, for example, could augment a relational database with voice access as an additional mode for accessing the data.

SUMMARY

In one embodiment, a method for speech recognition resolution in a database is provided which includes receiving an audio request (utterance) from an end-user or an application, such as a VoiceXML application, and dispatching it to a database. The method further includes converting the utterance to an intermediate form suitable for searching, transmitting the intermediate form from the database to a speech recognition search technology, performing matching via the speech recognition technology, returning items matching the utterance to the database with a score or confidence metric for each relevant utterance match and returning an ordered result set from the database based upon the scores.

BRIEF DESCRIPTION OF DRAWINGS

The invention, together with the advantages thereof, may be understood by reference to the following description in conjunction with the accompanying figures, which illustrate some embodiments of the invention.

FIG. 5 is a table illustrating an example of an embodiment of an ordered result set.

DETAILED DESCRIPTION

Figure 1:
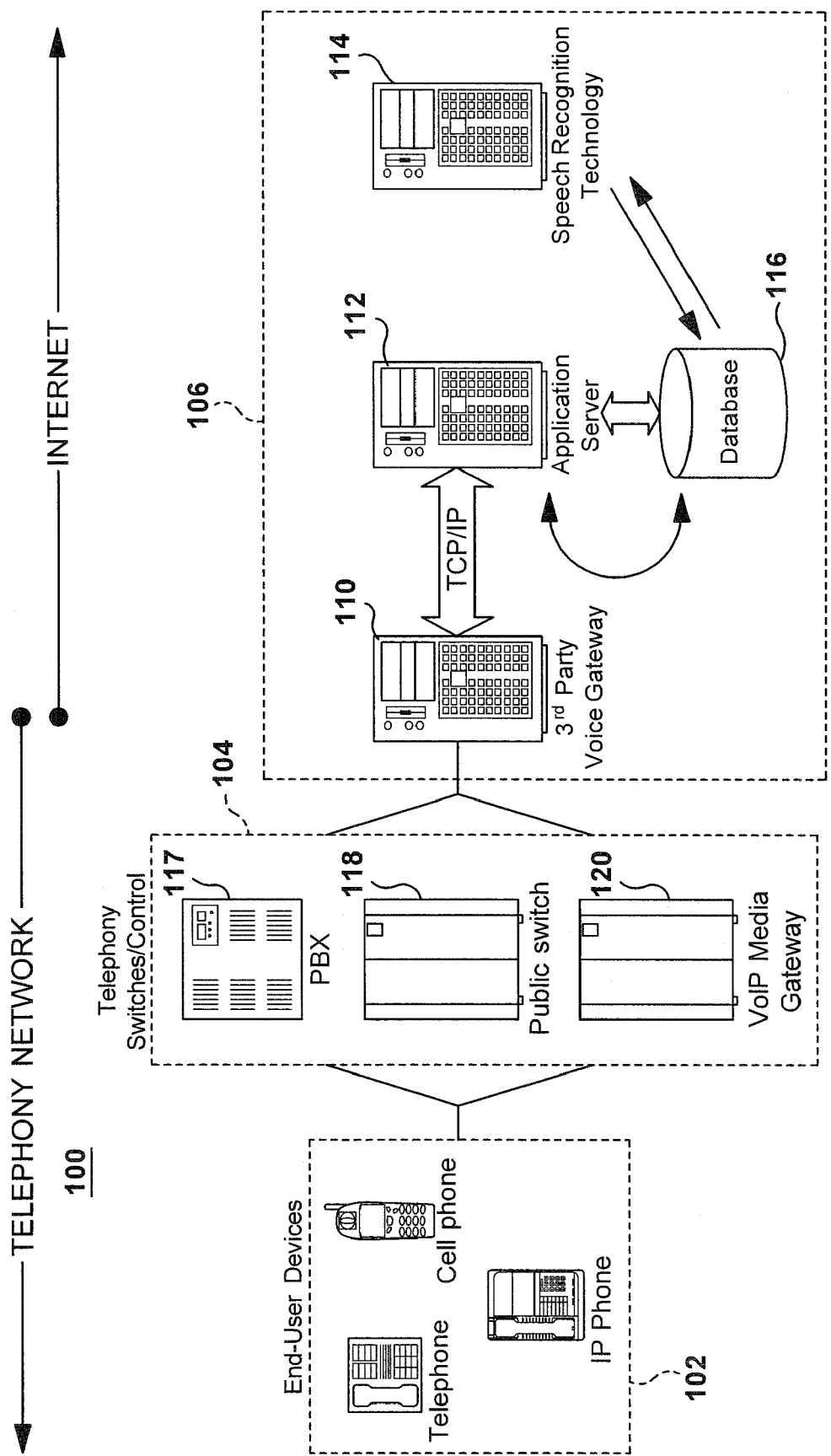
FIG. 1 is a functional block diagram illustrating an example communication network suitable for speech recognition, including large-scale speech recognition, in the database layer.

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

FIG. 1 is a functional block diagram illustrating an example of a communication network 100 suitable for utilizing speech recognition resolution, in the database layer 116. The system of FIG. 1 is particularly suitable for application of large scale speech recognition technology. In this example the communication network 100, includes a data network 106, which may be any suitable network, for example, the Internet, an Extranet or Intranet, etc. The network 106 is connected in this embodiment to an end user device 102, such as a landline telephone, a cellular phone, or an Internet Protocol phone via a telephone switch or other control system 104.

In a specific embodiment, the communication network 100 allows an end user to make a voice channel connection to the data network 106 for audio communication over a voice based telephony communication system such as a telephony switch/control system 104, examples of which include the following systems: a public telephone switch 118, a VoIP (Voice over Internet Protocol) media gateway 120, a Private Branch Exchange (PBX) system 117, etc. For example, the public switch 118 may be any public carrier and may also include other communication networks; it may include a wireless telecommunication network that provides connectivity to the public switched telephone network (PSTN), control functions, and switching functions for wireless users, as well as connectivity to Voice Gateways.

The exemplary communication network 100 shown comprises a Voice Gateway 110, which is coupled to the telephony switch/control system 104, for example the public switch 118. The telephony switch/control system 104 couples the audio communication between the Voice Gateway 110 and a suitable (voice receiver) end user device 102. An application server 112, which may be any suitable server, is coupled to the Voice Gateway 110 and to a database 116, as shown. In some embodiments the database 116, may include a dedicated database server. The application server 112 may, for example, run a Web site, or Internet application, and in one embodiment allows the Website or the application to be accessible from any browser or mobile device.

The database 116 may, for example, host the dataset to be accessed using speech recognition technology. The database 116 is coupled, in the embodiment illustrated, to speech recognition technology 114 which provides programming interfaces to facilitate initialization and searching over the data sets. In some embodiments, large scale speech recognition technology is utilized.

Referring to FIG. 1, the Voice Gateway 110 provides an audio communication bridge between the telephony/switch control system 104, and the application server 112 as shown using any standard format. A Voice Gateway 110 can typically support multiple technologies including, but not limited to Automated Speech Recognition (ASR), Text-To-Speech (TTS) technologies, browser functionalities (e.g. for connecting to the Internet using standard TCP/IP [Transmission Control Protocol over Internet Protocol] protocols to interpret voice data in formats such as Voice XML, SALT, XHTML+V, etc. . . . ), media playback and recording capabilities and telephony technologies to connect the system to the telephony network. Examples of other protocols and languages that may be used in various embodiments include, but are not limited to: WAP (Wireless Application Protocol), HTML (Hyper Text Markup Language), HDML/WML, MXML, XHTHL, etc.

Referring to the embodiment of FIG. 1, the application server 112 interacts with both the Voice Gateways 110 and the database 116. This interaction can involve, for example, user management, session management, and Voice XML (VXML) delivery to the Voice Gateway 110 end of the communication path. The speech recognition technology 114 may be designed to provide state-of-the-art voice search algorithms and may comprise large scale speech recognition technology. The speech recognition technology typically performs such tasks as transcription, comparison and sorting and includes associated API's exposing this functionality. In some embodiments the speech recognition technology may be provided by a third party speech recognition provider and may be integrated within the database server and/or may be provided by the provider of other technology in the system.

In the embodiment of FIG. 1, voice requests for data in the database are passed through the Voice Gateway 110 to the application server 112. The application server converts the request to a suitable form for presentation to the database. In one embodiment, the request is in the form of a SQL statement which uses an audio SQL function (referred to herein as the "soundslike" function). The "soundslike" function takes as input an audio file parameter corresponding to a recorded voice utterance. This soundslike function can provide an audio file which may be, for example, an audio byte stream, a reference to an audio file, or a phonetic transcription of the audio file. This audio file may then be converted, if necessary, to the form required by the speech recognition technology 114 and passed thereto. The speech recognition technology performs the required recognition tasks on the passed in audio file and returns a set of results including a recognition score or confidence metric indicating the degree to which the speech recognition technology was able to recognize the input. For example, a set of rows from the database determined to match the audio file could be returned with associated confidence metrics. Thus, the speech recognition technology returns a ranked result linked to a subset of the original data table. The database then uses that ranked subset to retrieve the information requested from the original data table and puts that information into a useable form.

The methods disclosed herein may be performed by a processor or processors using instructions that may reside on a computer-readable medium. The computer-readable medium may be any suitable computer readable storage medium such as, but not limited to random access memory, read-only memory, flash memory, CDROM, DVD, solid-state memory, magnetic memory, optical memory, and the like. The voice-enabled systems and methods described herein address three key issues raised by a speech recognition enabled databases especially large scale systems. The first issue concerns the initializing and maintaining a set of searchable data. As described in detail hereinafter with regard to initialization, original datasets in the database preferably are initialized on the database by applying the speech recognition technology prior to runtime to make them voice-searchable. The second issue relates to the access of a particular speech recognition provider's technology 114 and the querying of a particular dataset with a user utterance using the large scale search technology 114. The third issue concerns the return of an ordered result set.

Figure 2:
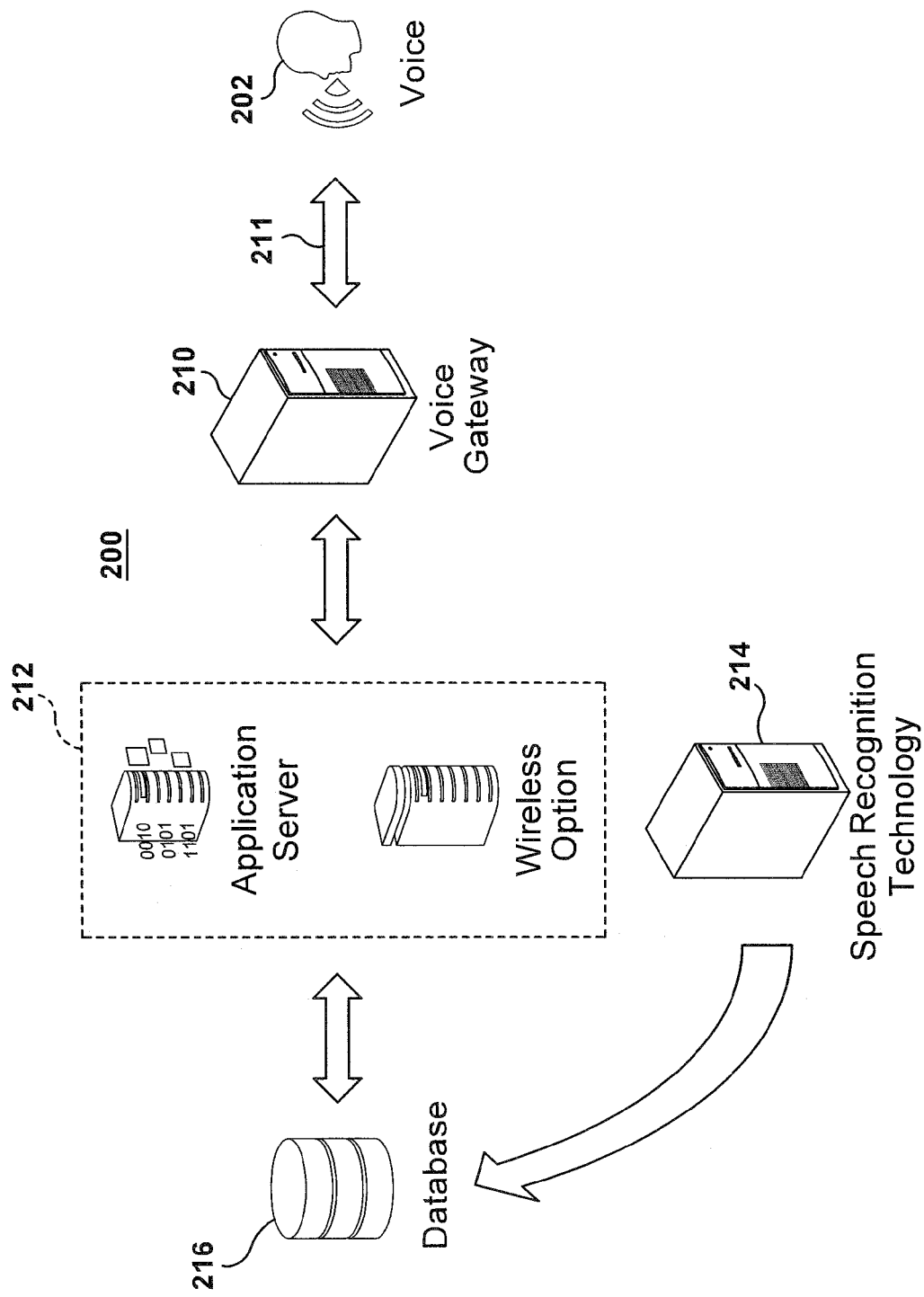
FIG. 2 is a functional block diagram illustrating an embodiment of a voice-enabled application that utilizes speech recognition in a database.

FIG. 2 is a functional block diagram illustrating one embodiment of a system 200 implementing a voice-enabled system that utilizes speech recognition resolution in the database 216 and which is particularly suitable for use with large scale speech recognition technology. In the illustrated example of FIG. 2, an application end user 202 may call a number on a Voice Gateway 210 on an input line 211, which then requests from an application server 212 an application corresponding to that input line 211 on the Voice Gateway 210. The application server 212 interactions with the Voice Gateway 210 may include, for example, user management, session management, and VXML generation. The system 200 permits searching data stored in the database 216 via voice requests. The inputs to a large-scale voice recognition database search system 200 can in some embodiments, be a user utterance or application generated utterance. The output of the system in some embodiments may be an ordered list of rows from the dataset that are considered matches to the user utterance.

In one embodiment, the Voice Gateway 210 may capture a user utterance which may originate from any suitable source. If the utterance to be interpreted is part of a large-scale voice request for data from the database, then in one embodiment, the utterance is recorded by the Voice Gateway 210 and sent to the application server 212. The application code being executed through the application server 212 may take the recorded utterance and pass it, for example, as an argument to a SQL function, to retrieve a set of results from the database 216 that match the recorded utterance. In some embodiments the database is pre-initialized with speech recognition searchable tables linked to the original datasets of the database.

Once the voice request is submitted to the database, such as by a SQL function, the database performs a search algorithm utilizing the speech recognition technology 214 which may in some embodiments be provided by a third party. As described hereinafter with reference to FIGS. 3-5, the database 216 in the illustrated embodiment first ensures that the argument is in searchable form and then submits it to the speech recognition technology which then performs a search and returns items matching the utterance, for example, in the form of a graded table (e.g. with confidence metrics). Subsequently, in some embodiments, the database 216 may use the graded table calculated by the speech recognition technology and return an ordered result set, for example, composed of the retrieved rows in order of decreasing confidence, from the database to the application. In one embodiment, the database maintains synchronicity through triggers on insertions, deletions, and updates.

Figure 3:
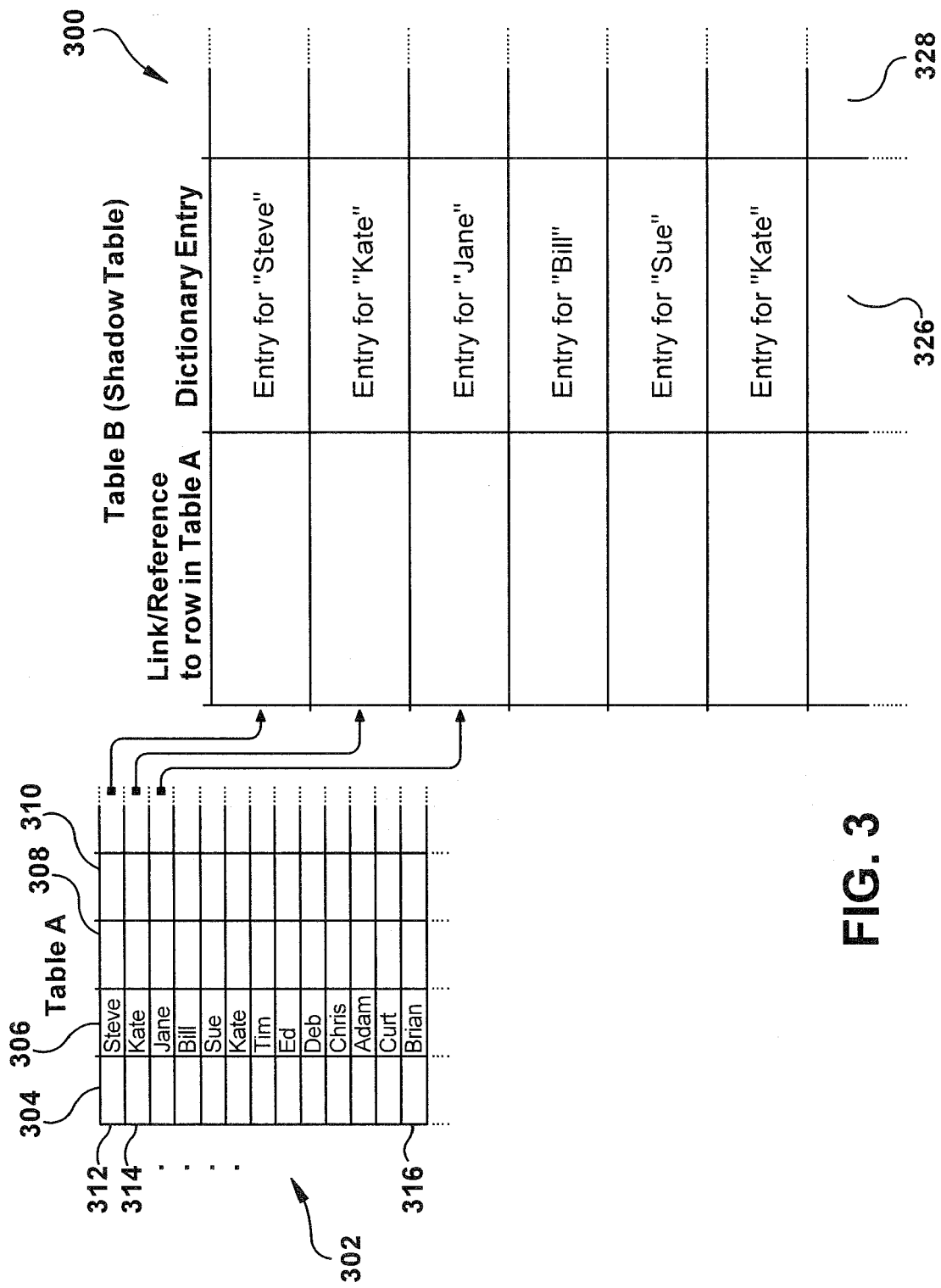
FIG. 3 is a diagram that illustrates an example of a shadow table arrangement for facilitating the initialization of a dataset to be made searchable by voice within a database using speech recognition.

In one embodiment, to initialize the database 216, of FIG. 2 to be voice searchable, a "shadow" table may be created in the database corresponding to each data table in the database. The shadow table, described in detail hereinafter with reference to FIG. 3, is a searchable representation of a voice searchable column from an original dataset in the database which is added to the database. Each row of the shadow table includes a reference or link back to the corresponding row of the original dataset and includes a conversion to voice searchable form of each entry of searchable text in the original dataset. The conversion represents the data in a transcribed form which can be used by the speech recognition technology. This conversion could be performed by a transcription algorithm which, for example, converts the human readable text of the data table to a representation (e.g. a phonetic representation) used by the speech recognition technology. The speech recognition technology compares the utterances to this shadow table to generate graded results which are then passed back to the database.

FIG. 3 is a diagram illustrating an example of a shadow table 300 corresponding to a table A of the original dataset of a database 302. The original data set may, for example, be composed of a table such as table A, having columns 304, 306, 308, 310 and rows 312, 314, 316. To initialize the database for searching, at least one shadow table 300 is generated corresponding to a column of the original data table 302 which it is desired to be searchable. This shadow table is added to the database. Thus, for example, if it was desired to voice search the name column 306 in FIG. 3, that column 306 would have a corresponding shadow table 300 created and added to the database. The shadow table 300 is generated by performing a transcription to a form usable by the speech recognition technology (e.g. phonetic transcription, etc.) on all the column entries of column 306 in the Table A. This transcription may be performed using an existing transcription algorithm of the speech recognition technology. Thus, in the example, the name column 306 could be transcribed into searchable form and put in column 326 of the shadow table. As illustrated, each row of the shadow table would also include a reference or link to the corresponding row of the original table A. The shadow table would typically contain a column with the same number of rows of searchable transcribed data as the original Table A, and a column corresponding to the link or reference back to the corresponding original dataset. One shadow table would be created for each column desired to be searched (e.g. if the data of column 308 was also to be voice searchable, then another shadow table would be generated and linked to that column as part of initialization of the database). The shadow table would typically be created prior to search as an initialization step but could be done later (e.g. at run-time). Further, insertions, deletions and updates to the table A could trigger an insertion, deletion or update to the shadow table to the shadow table synchronized with the dataset table.

In another embodiment, an additional "searchable" column can be added directly to the table. In this embodiment, the transcribed version of the data of a column to be made searchable is inserted as an additional table column (e.g. in Table A) and linked to the corresponding original data column.

In some other embodiments, the original table (e.g. table A) can include notations (e.g. an added parameter or flag associated with a column or each data item) to indicate which portions (e.g. column) are desired to be made searchable. The flagged data items would then be selected to be transcribed to searchable form and for generation of a corresponding shadow table. The notations could be added as a parameter at an early stage prior to initialization of the shadow table, or modified later, in either case using the capabilities of standard SQL commands such as CREATE TABLE and/or ALTER TABLE The shadow table 300 is passed to the speech recognition technology to do the search/matching function to match the audio request to the shadow table. Once the speech recognition technology identifies matching rows with associated confidence metric, the resulting graded shadow table is passed to the database with the confidence metrics.

Figure 4:
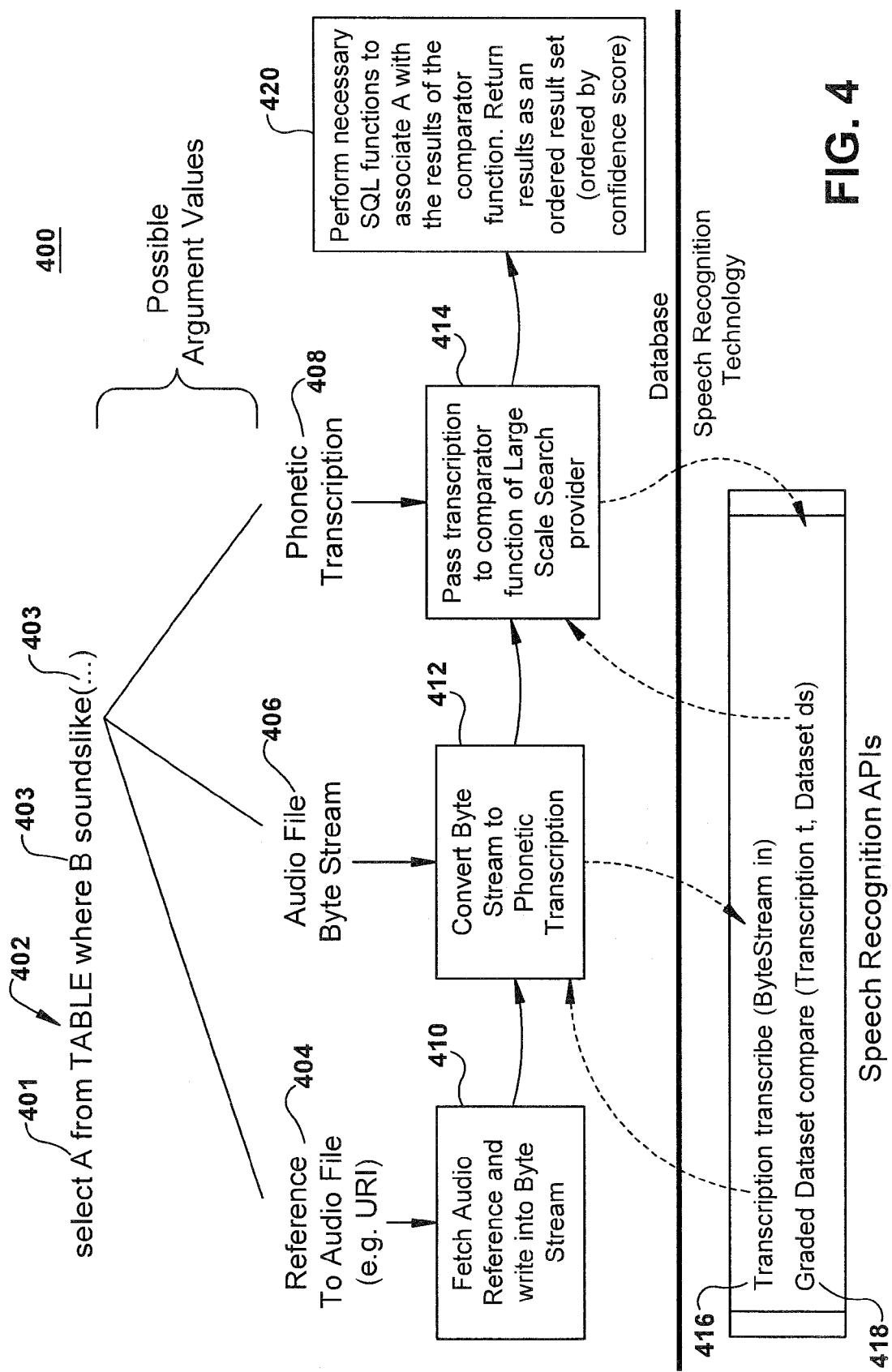
FIG. 4 is a chart illustrating an embodiment of a method of facilitating voice searchability in a database using speech recognition within a database.

FIG. 4 is a chart illustrating one embodiment 400 of a method of facilitating voice searchability in a database using speech recognition in a database such as the system of FIG. 2. The example of FIG. 4 illustrates one embodiment of an SQL statement that can be used to implement a data request. A SQL statement 402 (i.e. "select A from TABLE where B soundslike ( . . . )") instructs the database to select information 401 (i.e. column A) from a table (e.g. Table A) which relates to information 403 in another column (i.e. column B) which is addressed by an input voice utterance using a special SQL "soundslike" function which includes an audio information parameter or argument 403 corresponding to the input voice utterance. The audio information parameter 403 may, for example, be a reference to an audio file 404, an audio file byte stream 406, or a phonetic transcription 408 of the voice utterance.

If the argument 403 of the soundslike function is a reference to an audio file (see 404), then the audio file is fetched and written into a byte stream, as shown at 410, and the fetched byte stream is converted to a searchable transcription of the byte stream, as indicated at 412. If the argument 403 is an audio file byte stream (see 406) then it is converted to a searchable transcription as shown at 412. In either event, the searchable transcription is passed to the comparator function of the speech recognition technology (see 414). If the argument 403 is already in the form of a searchable transcription (see 408) then it is passed to the speech recognition technology as illustrated at 414. When transcription is required, the speech recognition technology provides transcription of the byte stream into a phonetic transcription as shown at 416. The searchable transcription is the form the audio input is put into to be usable by the speech recognition technology (e.g. the phonetic or other intermediate form the technology uses to do its search/matching). This transcription can typically be performed by an API provided by the speech recognition technology provider.

Once in transcribed form, the input argument is passed to the speech recognition technology to perform a search/comparison function against the shadow table for the table identified for search (e.g. Table A). The transcription argument is compared to shadow tables (dataset ds) which had been stored as part of the database corresponding to the stored data set as illustrated at 418. The result of this matching process is a graded version of the shadow table passed back to the database with associated score or confidence metric. This graded shadow table is then formed into an ordered result set by the database. The ordered result set is ordered to present those entries in the dataset that most closely match the transcription argument first and those that least closely match are presented last along with a score or confidence metric. As illustrated at 420, the database performs any necessary SQL functions to associate the original request with the results of the comparator function (i.e. the graded shadow table) to generate as ordered result set that is ordered based on the provided score or confidence measure. Thus, the speech recognition technology compares the transcription of the voice utterance against a searchable representation of the original dataset (i.e. the shadow table) to generate the graded shadow table. Subsequently, the database takes the graded a shadow table and re-associates it with the actual original dataset, providing the ability to return data out of the original dataset in the form of an ordered result set.

In some embodiments, the graded shadow table can be limited to only those matches that have a confidence metric that exceeds a threshold. In such an instance, the shadow table returned to the database would typically represent a subset of the entire shadow table. Alternatively, the entire shadow table with associated confidence metric can be returned to the database and the database can then eliminate those entries that are below a threshold. In another alternative, the speech recognition technology can sort the graded shadow table in order of confidence metric magnitude, or return the graded shadow table unsorted. If a sorted graded shadow table is returned, in some embodiment, the returned graded table may exclude the specific confidence metric because the order constitutes an implicit confidence metric. If an unsorted graded shadow table is returned, then the database may sort the graded shadow table as well as retrieve the requested data from the original table of data to which the shadow table is linked. The ordered result set is then formed containing the original data associated with the match in the graded shadow table and corresponding confidence metric sorted in order of the confidence metric. The order may be any order specified (e.g. ascending, descending, etc.).

An example of an ordered result set 500 is illustrated in FIG. 5. An ordered result set is a temporary data structure to encapsulate multiple rows or records (i.e. the result of data from a database where the ordering of the rows or records is important). The ordered result set 500 as illustrated shows an ordered set returning three rows which were matched to the audio argument or the three rows with a confidence metric that exceeded the minimum threshold. A confidence metric 502 is provided for each row, and the rows are presented in order from the higher confidence level at the top to the lowest at the bottom. The column data for each matched row is the original data specified by the initiating SQL statement sorted to placed them in order of descending confidence with the appended confidence metric. Thus, the database creates this temporary data structure, the ordered result set 500, constituting an ordered list of the rows matched and an appended metric as the response to original voice search request. Other variations of the ordered result set may be utilized by specifying other parameters, for example, the result set could be limited to the top few matches (e.g. the three rows with the highest confidence metric), or by omitting the confidence metric and providing the results in order of confidence (i.e. the metric is implicit in the order).

Specific embodiments of methods and apparatus for providing speech recognition resolution in the database layer have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover any and all modifications, variations, or equivalents that fall within the true spirit and scope of the basic underlying principles disclosed and claimed herein.

What is claimed is:

1. A method for providing speech recognition in a database, comprising:
    receiving, with a first processor, an utterance from an end-user or an input application;
    converting the utterance to an intermediate form suitable for searching using speech recognition technology;
    receiving, with a database, intermediate form of the utterance that is suitable for searching using speech recognition technology;
    transmitting the intermediate form from the database to a speech recognition technology, where the speech recognition technology comprises a second processor;
    causing the speech recognition technology to perform item-matching as between the intermediate form and voice searchable representations of data stored in the database via the speech recognition technology, and to return items matching the intermediate form to the database; and
    providing data associated with the one or more of the returned items in the form of an ordered result set.

2. The method as in claim 1 wherein the database is initialized by generating at least one shadow table that stores the voice searchable representations associated with data in the database.

3. The method as in claim 2 wherein the dispatching step further comprises utilizing an SQL function having at least a representation of the utterance as an argument.

4. The method as in claim 2 wherein the items matching the intermediate forms are returned to the database as a graded shadow table.

5. The method as in claim 1 wherein the speech recognition technology is large scale speech recognition technology.

6. The method as in claim 1 comprising returning a confidence metric for each returned item and where the providing one or more of the returned items is performed by selecting one or more items matching the intermediate form for return based, at least in part, on the confidence metric associated with the matching item.

7. A method for providing speech resolution in a database, the method comprising:
    causing a processor to determine a voice searchable form for data in a database;
    electronically storing, in the database, for use by speech recognition technology, a respective determined voice searchable form for respective data in a manner that associates the voice searchable form with the data;
    providing access to the voice searchable form to speech recognition technology for item matching as between an utterance received as part of a query on the database and the voice searchable form.

8. The method as in claim 7 where the associating of a voice searchable form of data is performed by constructing a shadow table that includes a transcription of an utterance corresponding to the data, the method further comprising maintaining the database by automatically updating the shadow tables in response to changes to the database.

9. The method as in claim 7 wherein the speech recognition technology is large scale speech recognition technology.

10. The method as in claim 7 further comprising providing a parameter in the database to flag data which is to be transcribed for a shadow table and linked thereto.

11. The method as in claim 7 wherein the returned match results are converted into an ordered result set by the database.

12. A system for providing speech recognition resolution within a database comprising:
    means for receiving an utterance from an end-user or an input application;
    means for converting the utterance to an intermediate form suitable for searching using speech recognition technology;
    means associated with the database for performing item-matching as between the intermediate form and voice searchable representations of data associated with items in the database via a speech recognition search algorithm, and returning items matching the intermediate form to the data base; and
    means associated with the database for converting the returned items into an ordered result set.

13. The system as in claim 12 wherein the database further comprises means for initializing by generating at least one shadow table that stores the voice searchable representations of data associated with items in the database.

14. A computer-readable medium having computer-executable instructions stored thereon that if executed by a computer cause the computer to perform a method for providing speech recognition in a database, the method comprising:
    receiving an intermediate form of an utterance suitable for searching using speech recognition technology from an end-user or an input application with a database coupled to a speech recognition technology;
    with the database, providing the intermediate form to speech recognition technology, where the speech recognition technology performs item-matching using, and receiving items matching the intermediate form from the speech recognition technology; and
    returning one or more matching items the form of an ordered result set for communication to the user.

15. The computer-readable medium having computer-executable instructions for performing the method as in claim 14 wherein the speech recognition technology is a large scale speech recognition technology.

16. The computer-readable medium having computer-executable instructions for performing the method as in claim 15 wherein the database is initialized by adding to the database at least one shadow table including a transcription of data in the database to a searchable form and a link to the corresponding data in the database.

17. The computer-readable medium as in claim 16 wherein the item matching is performed by the search recognition technology by matching the shadow table data to the intermediate form.

18. The computer-readable medium of claim 17 wherein the receiving step comprises receiving an SQL function having at least a representation of the utterance as an argument.

19. The computer-readable medium of claim 17 further comprising updating the shadow table automatically in response to changes in the database.

20. The computer-readable medium of claim 17 wherein the item matching compares the shadow table to the intermediate form of the utterance.

* * * * *

UNITED STATES PATENT AND TRADEMARK OFFICE
CERTIFICATE OF CORRECTION

| | | |
|---|---|---|
| PATENT NO. | : 7,752,048 B2 | Page 1 of 1 |
| APPLICATION NO. | : 11/140647 | |
| DATED | : July 6, 2010 | |
| INVENTOR(S) | : Karen Lynn Sprague et al. | |

It is certified that error appears in the above-identified patent and that said Letters Patent is hereby corrected as shown below:

On the title page, item (56), in column 2, under "Other Publications", line 1, after "60/425,178," insert -- filed on Nov. 8, 2002, --.

In column 4, line 46, delete "XHTHL," and insert -- XHTML, --, therefor.

In column 7, line 24, delete "TABLE" and insert -- TABLE. --, therefor.

In column 9, line 23, in claim 1, delete "intermediate" and insert -- the intermediate --, therefor.

Signed and Sealed this
Nineteenth Day of April, 2011

David J. Kappos
*Director of the United States Patent and Trademark Office*